United States Patent
Ions

(10) Patent No.: US 7,901,616 B2
(45) Date of Patent: Mar. 8, 2011

(54) METHOD OF BUILDING A DIRECT SMELTING PLANT

(75) Inventor: Philip James Ions, Shelley (AU)

(73) Assignee: Technological Resources Pty. Limited, Melbourne (AU)

(*) Notice: Subject to any disclaimer, the term of this patent is extended or adjusted under 35 U.S.C. 154(b) by 824 days.

(21) Appl. No.: 10/593,062

(22) PCT Filed: Mar. 17, 2005

(86) PCT No.: PCT/AU2005/000389
§ 371 (c)(1),
(2), (4) Date: Jul. 6, 2007

(87) PCT Pub. No.: WO2005/090711
PCT Pub. Date: Sep. 29, 2005

(65) Prior Publication Data
US 2007/0261321 A1    Nov. 15, 2007

(30) Foreign Application Priority Data
Mar. 17, 2004 (AU) ............................. 2004901418

(51) Int. Cl.
*C21B 7/00* (2006.01)
*E04B 1/00* (2006.01)
*E04B 1/08* (2006.01)

(52) U.S. Cl. ......... 266/142; 266/143; 266/900; 266/901; 52/74.1; 52/111

(58) Field of Classification Search ............... 52/741.1, 52/741.14, 745.01, 745.02, 745.05, 745.08, 52/745.09, 745.1, 745.13, 745.17, 745.19, 52/745.2, 11–120; 266/142–143, 900–901
See application file for complete search history.

(56) References Cited

U.S. PATENT DOCUMENTS

| | | | | | |
|---|---|---|---|---|---|
| 3,494,091 | A | * | 2/1970 | Turturro, Jr. et al. | 52/745.02 |
| 3,700,117 | A | * | 10/1972 | Corley | 414/12 |
| 3,830,380 | A | * | 8/1974 | Spencer | 206/386 |
| 3,863,780 | A | * | 2/1975 | Gottlieb et al. | 414/391 |

(Continued)

FOREIGN PATENT DOCUMENTS

CA    2 467 310 A1    11/2003

(Continued)

*Primary Examiner* — Jeanette E. Chapman
(74) *Attorney, Agent, or Firm* — Finnegan, Henderson, Farabow, Garrett & Dunner, L.L.P.

(57) ABSTRACT

Method of building a direct smelting plant comprising a metal smelting vessel (11) and ancillary plant components such as the components of a hot air supply station (24), an offgas treatment station (32), a solids feed station (41), a hot metal desulphurization station (47) and hot metal and slag launders extending from the smelting vessel (11). The ring track (53) of a ringer crane (51) is installed in front of location at which vessel (11) is to be installed. Crane boom (54) is laid out along elongate stretch of the building site which becomes a corridor (60) between major ancillary components when plant is fully erected. Boom (54) is connected to crane carriage (52) and hoisted to provide high lift capacity over a ground area embracing proposed site of vessel (11) and ancillary components. Prefabricated components are then lifted by crane (51) into appropriate position for final installation. After installation is completed boom (54) is laid down along corridor (60) and crane (51) is dismantled and removed, leaving corridor (60) as an access laneway.

29 Claims, 8 Drawing Sheets

U.S. PATENT DOCUMENTS

| | | | |
|---|---|---|---|
| 5,222,448 A * | 6/1993 | Morgenthaler et al. | 110/346 |
| 6,474,487 B1 * | 11/2002 | Kretschmer | 212/298 |
| 4,382,519 A * | 5/1983 | Beduhn et al. | 212/195 |
| 4,394,911 A | 7/1983 | Whitman et al. | |

FOREIGN PATENT DOCUMENTS

| | | |
|---|---|---|
| EP | 0 411 126 A1 | 2/1991 |
| JP | 2001-042076 | 2/2001 |
| SU | 1305281 A1 | 4/1987 |

\* cited by examiner

METHOD OF BUILDING A DIRECT SMELTING PLANT

CROSS REFERENCE TO RELATED APPLICATIONS

This application is a national phase application of International Application Number PCT/AU2005/000389, filed Mar. 17, 2005, and claims the priority of Australian Patent Application No. 2004901418, filed Mar. 17, 2004, the content of both of which is incorporated herein by reference.

TECHNICAL FIELD

The present invention relates to direct smelting plant for producing molten metal in pure or alloy form from a metalliferous feed material such as ores, partly reduced ores and metal-containing waste streams.

A known direct smelting process, which relies principally on a molten metal layer as a reaction medium, and is generally referred to as the HIsmelt process, is described in International Patent Publication WO 96/31627 (International Patent Application PCT/AU96/00197) in the name of the applicant. The HIsmelt process as described in the International application comprises:

(a) forming a bath of molten iron and slag in a vessel;
(b) injecting into the bath:
  (i) a metalliferous feed material, typically metal oxides; and
  (ii) a solid carbonaceous material, typically coal, which acts as a reductant of the metal oxides and a source of energy; and
(c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$ released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the metal layer through a number of lances/tuyeres which are inclined to the vertical so as to extend downwardly and inwardly through the side wall of the smelting vessel and into the lower region of the vessel so as to deliver the solids material into the metal layer in the bottom of the vessel. To promote the post combustion of reaction gases in the upper part of the vessel, a blast of hot air, which may be oxygen enriched, is injected into the upper region of the vessel through the downwardly extending hot air injection lance. Offgases resulting from the post-combustion of reaction gases in the vessel are taken away from the upper part of the vessel through an offgas duct.

The HIsmelt process enables large quantities of molten metal to be produced by direct smelting in a single compact vessel. However, in order to achieve this it is necessary to transport hot gases to and from the vessel, to transport the metalliferous feed material to the vessel and to transport the molten metal product and slag away from the vessel all within a relatively confined area. This requires the installation of various major ancillary components in the plant. For example, there will generally be gas heating stoves and ducting for supply of heated input gas to the vessel; solids feed equipment for feeding ore and coal to the vessel which equipment may include apparatus for pre-heating the ore; offgas ducting and offgas treatment apparatus such as offgas scrubbing and demisting apparatus and molten metal and slag tapping and handling equipment. All of these components must operate continuously through a smelting operation which can be extended over a long period and it is necessary to provide for access to the vessel and ancillary components for maintenance and lifting of equipment between smelting operations.

Building a direct smelting plant of the kind described above presents major problems in that it is necessary to erect various kinds of major equipment sourced from different manufacturers at a single site area. The present invention facilitates offsite prefabrication and assembly of the major plant components which components can then be transported to the site and lifted into position in less time and with less people on site than has been possible with conventional erection of each of the components on site.

DISCLOSURE OF THE INVENTION

The invention employs a ringer crane of a kind in which a boom carrying crane carriage is supported on a ring track and which carries one or more counter weights to counter the load to be lifted. A crane of this kind is flexible in operation in that it can lift relatively small or large loads with minimum adjustment or change to the crane structure.

The invention provides a method of building a direct smelting plant comprising:

locating a ring track of a ringer crane on a plant site such that a lifting boom of the ringer crane can sweep a ground area about the ringer track;

installing a metal smelting vessel and ancillary plant components within said swept ground area by lifting with the crane the vessel and ancillary plant components either as prefabricated whole units or in prefabricated pieces into locations within the swept ground area, but so as to leave an elongate corridor of vacant ground extending through the swept area to the ring track;

lowering the boom down into the corridor; and dismantling and removing the ringer crane and leaving at least part of the corridor available for vehicular access to the metal smelting vessel.

Substantially all or a major part of the corridor may be left available for vehicular access to the smelting vessel and at least some of said auxiliary components.

The ring track of the ringer crane may be a circular track and may be spanned by a crane carriage extending diametrically across the track and rotatable about a central vertical axis.

The boom of the crane may in use be attached to the carriage at one side of the carriage generally above the track and the crane counterweight or counterweights may be supported on the carriage generally over the track at or toward an opposite side of the carriage.

The major plant components may comprise any one or more of vessel input gas heaters and ducting, vessel input solids feed apparatus, offgas ducting and treatment apparatus; and molten metal and slag tapping and handling apparatus.

At least some of the ancillary plant components may be positioned at locations spaced along the corridor. More specifically, they may be positioned generally in rows spaced to either side of the corridor.

The smelting vessel may be positioned at an end of the corridor.

More particularly, the smelting vessel may be initially located adjacent the crane ring track in alignment with the corridor and at least some of the ancillary plant components located generally in rows extending from the reducing vessel along and to either side of the corridor.

The crane may be assembled initially by laying the boom out along the ground which is to form the corridor and then erecting the boom to extend upwardly from the ring track.

The vessel and major plant components may then be transported to the corridor area and lifted from that area by the crane into said locations.

The invention also extends to a method of building a direct smelting plant consisting of a smelt reduction vessel and ancillary plant using a heavy lift crane, comprising:

forming a load bearing base for the heavy lift crane on the site of the direct smelting plant;

locating the heavy lift crane on the load bearing base and assembling the lifting boom to the carriage of the crane so as to enable the boom to sweep a ground area about the carriage to thereby provide a swept ground area;

installing the smelt reduction vessel and ancillary plant components within the said swept ground area by lifting with the crane the vessel and ancillary plant components either as prefabricated whole units or in prefabricated pieces into locations within the swept ground area while leaving an elongate corridor of vacant ground extending through the swept area to the carriage;

lowering the boom down into the corridor; and dismantling and removing the crane and leaving at least part of the corridor available for vehicular access to the metal smelting vessel.

BRIEF DESCRIPTION OF THE DRAWINGS

In order that the invention may be more fully explained, one particular embodiment will be described in some detail with reference to the accompanying drawings in which.

DETAILED DESCRIPTION OF THE PREFERRED EMBODIMENT

Figure 1:
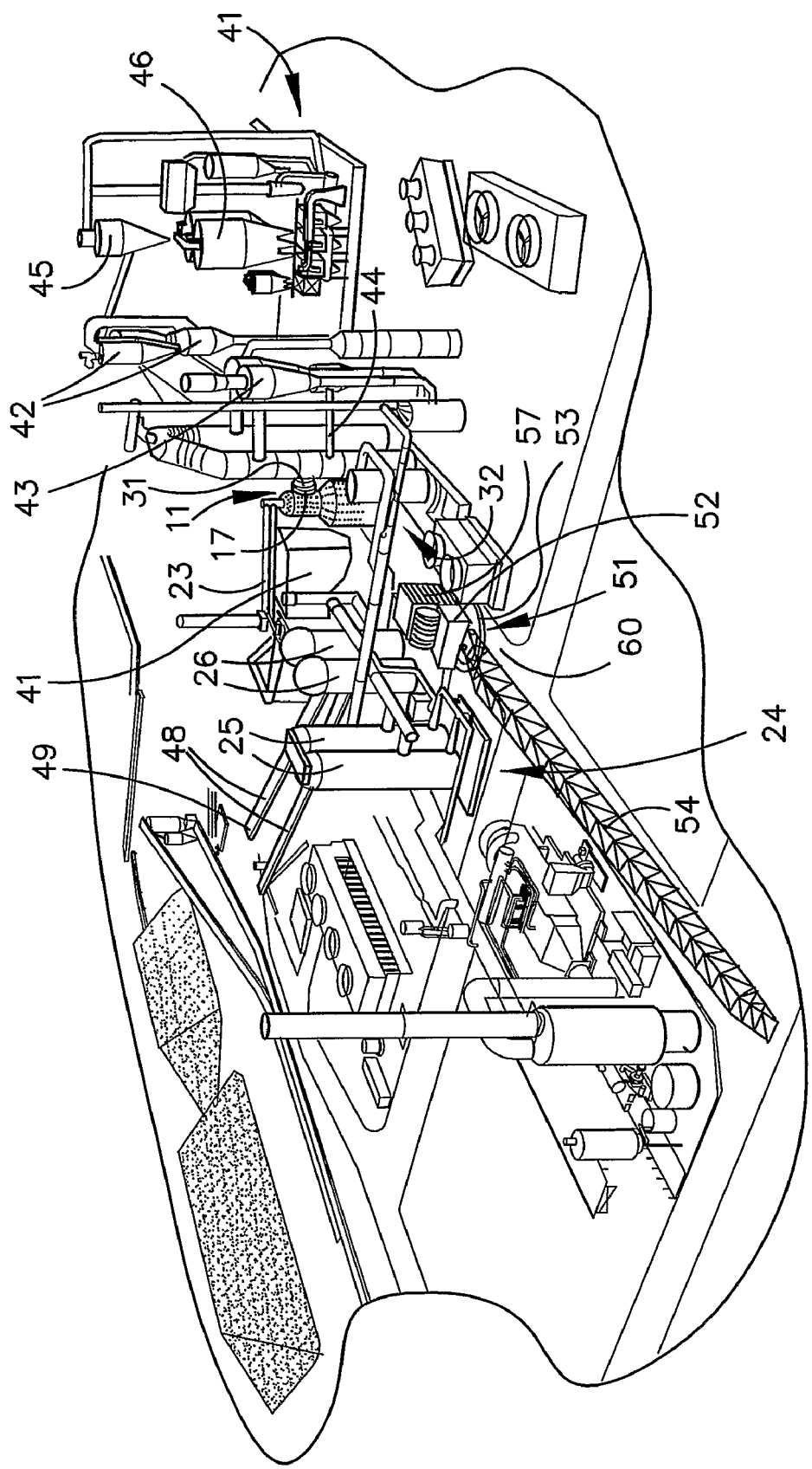
FIG. 1 is a diagrammatic perspective view of a direct smelting plant to be built in accordance with the present invention.

The illustrated direct smelting plant comprises a direct smelting vessel 11 suitable for operation by the HIsmelt process as described in International Patent Publication WO 96/31627. Vessel 11 has a hearth that includes a base 12 and sides 13 formed from refractory bricks; side walls 14 which form a generally cylindrical barrel extending upwardly from the sides 13 of the hearth and upper barrel section 15; a roof 16 an outlet 17 for offgases; a forehearth 18 for discharging molten metal continuously; and a tap hole 19 for discharging molten slag.

Figure 2:
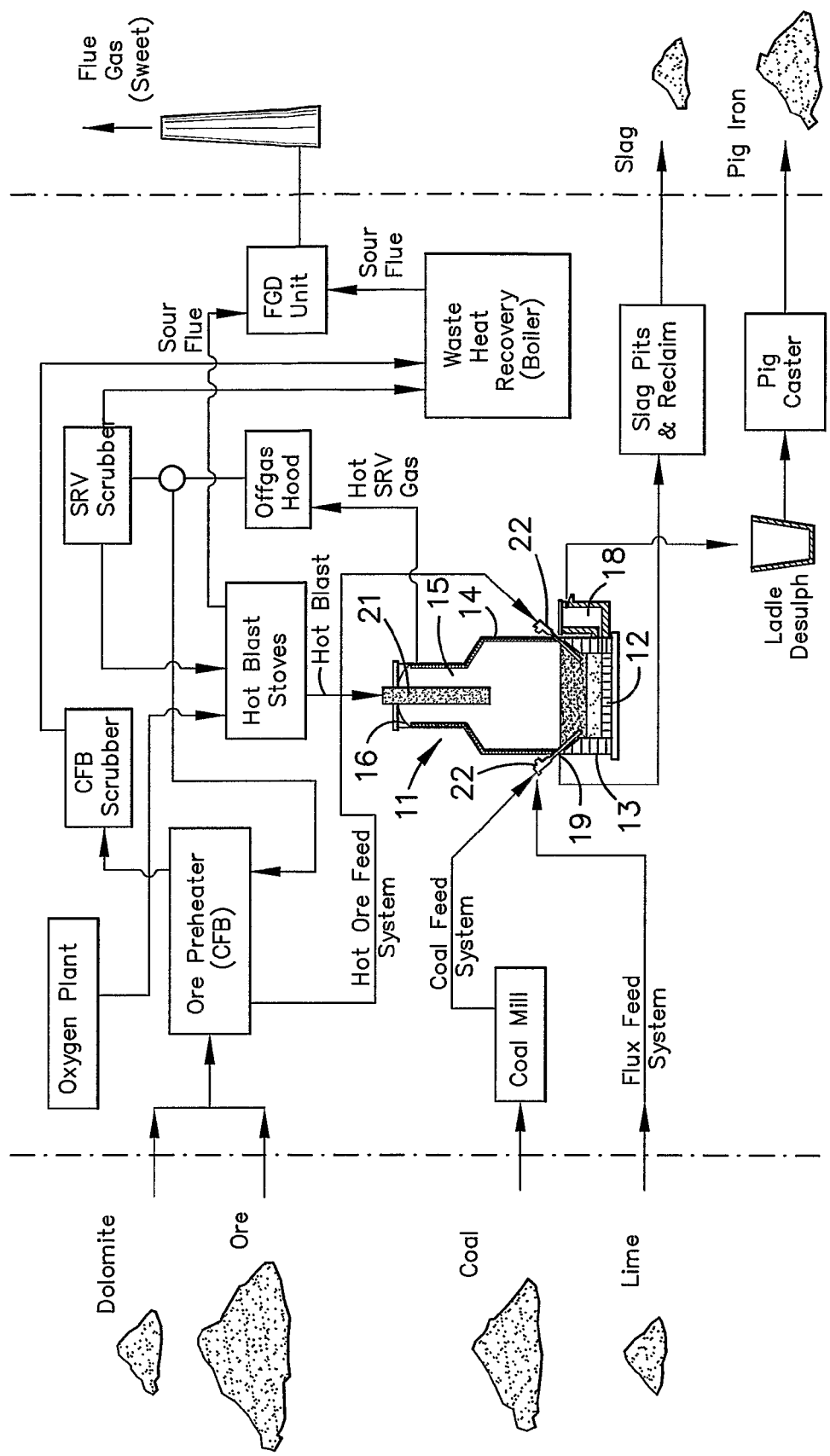
FIG. 2 is a diagrammatic flow sheet showing the overall operation of the plant.
Figure 3:
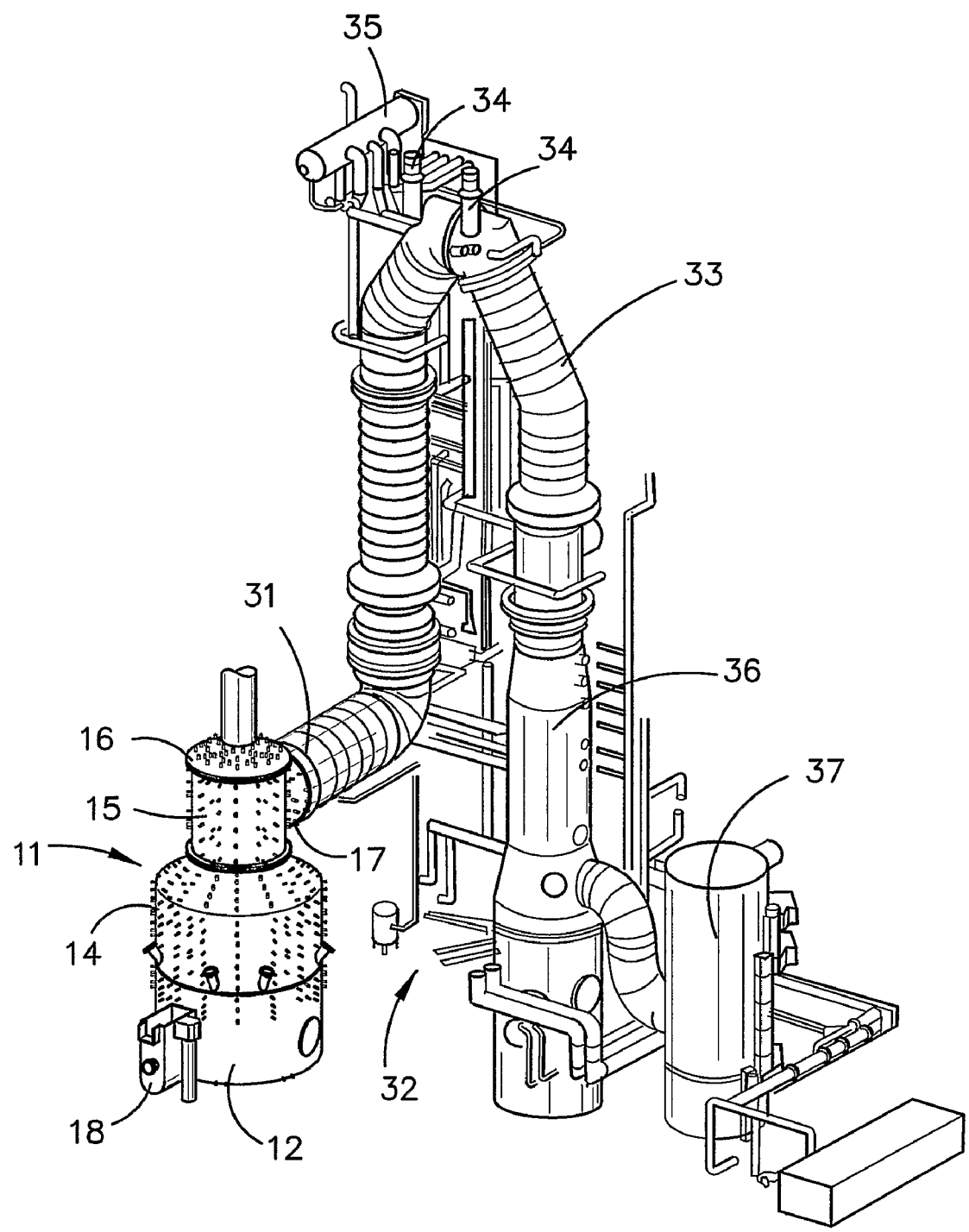
FIG. 3 is a detailed view of a reduction vessel and offgas handling facilities incorporated in the plant.
Figure 4:
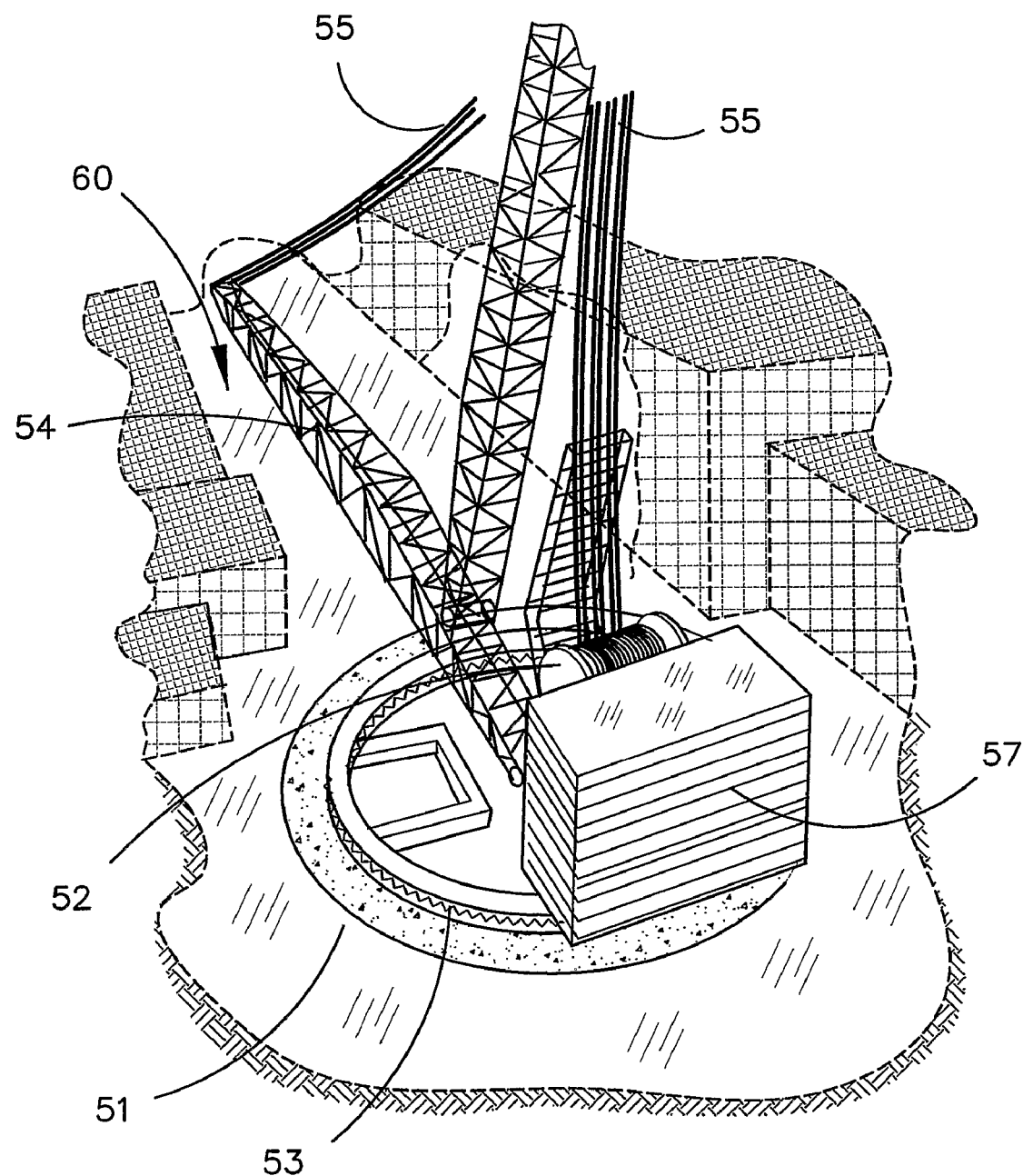
FIG. 4 is a perspective view of a ringer crane.
Figure 5:
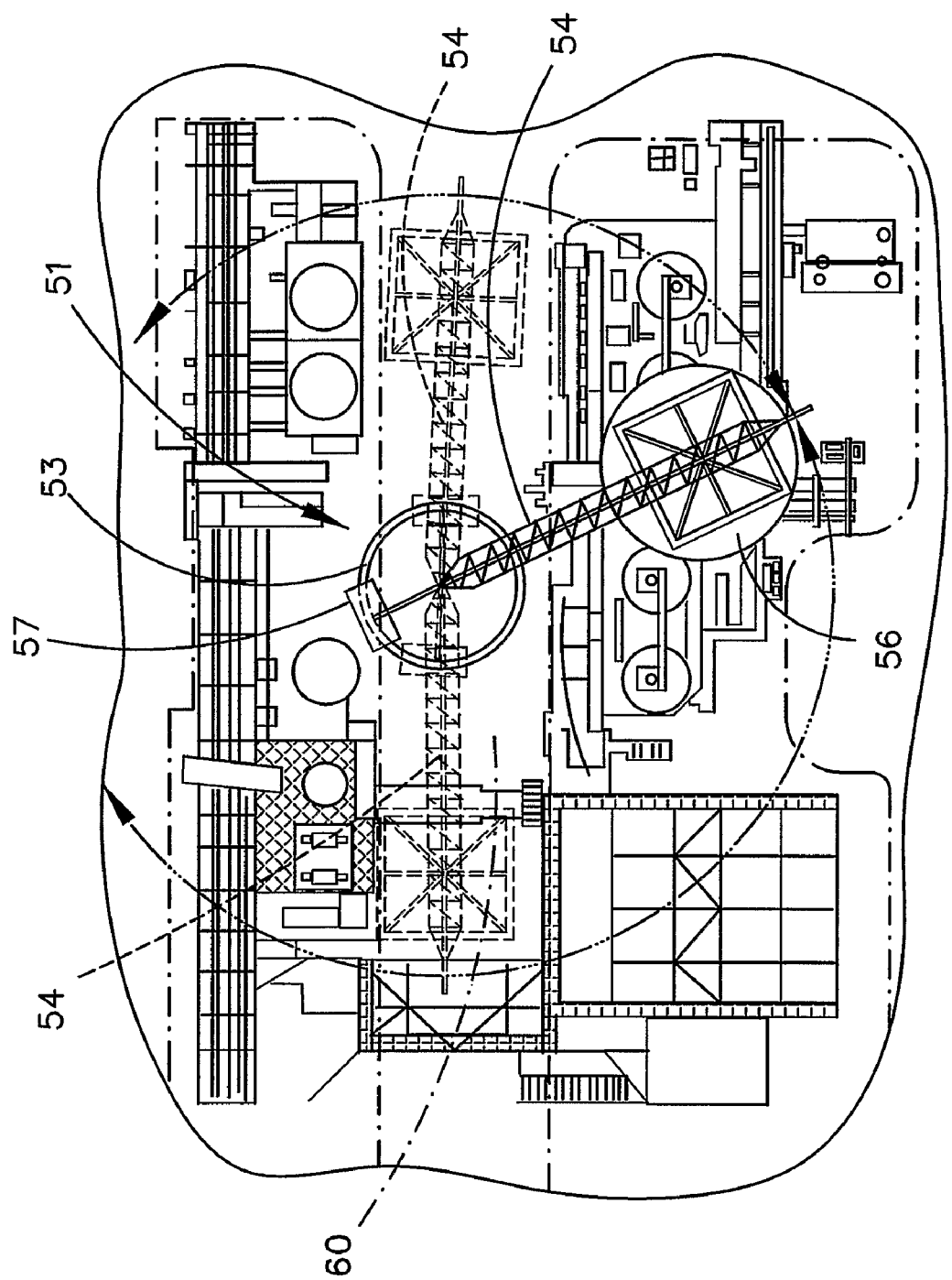
FIG. 5 is a diagrammatic plan of a central part of the plant site showing the position of the ringer crane.
Figure 6:
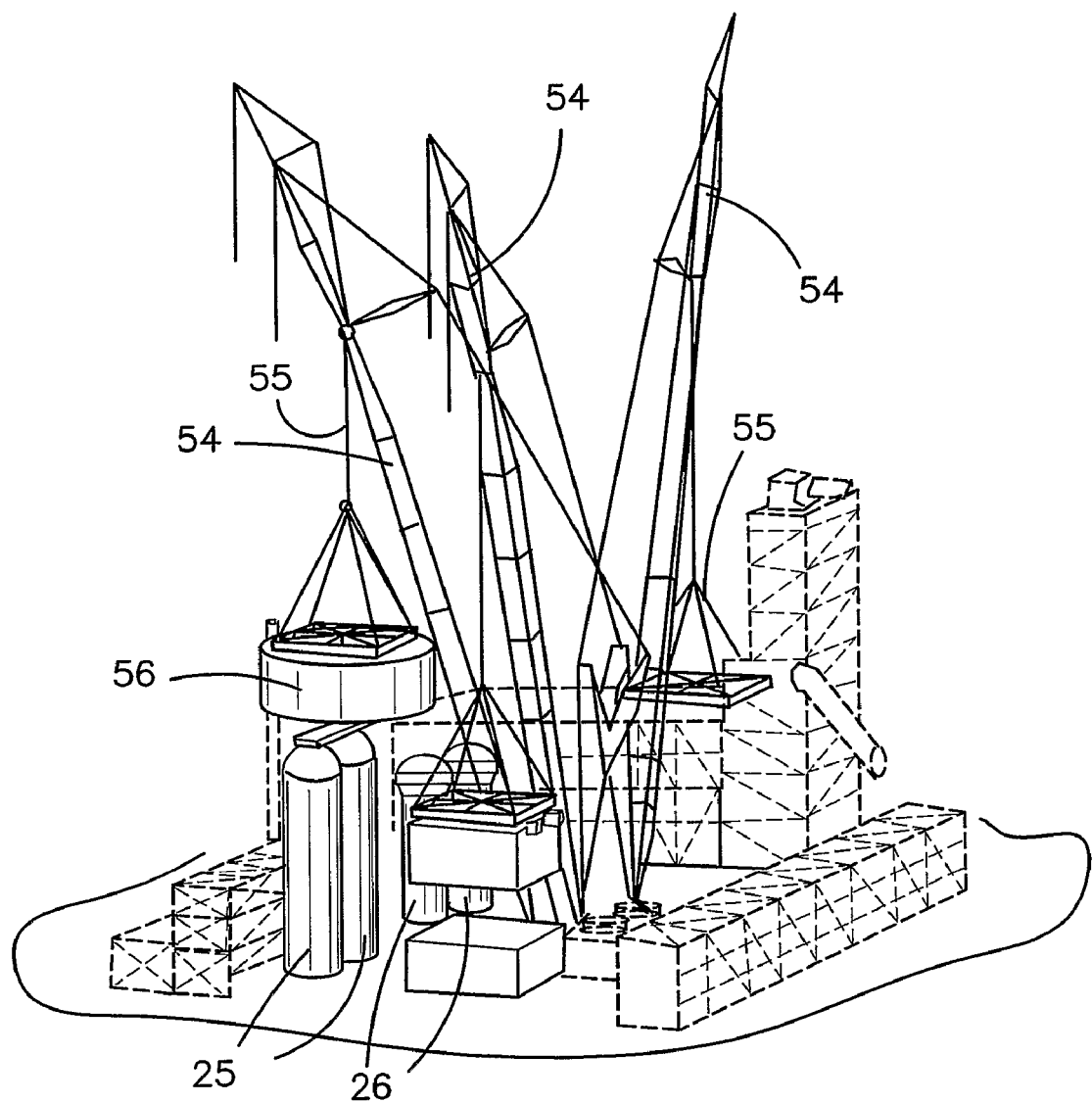
FIGS. 6 and 7 show the crane in operation to hoist a section of a smelting vessel into position on the site.
Figure 7:
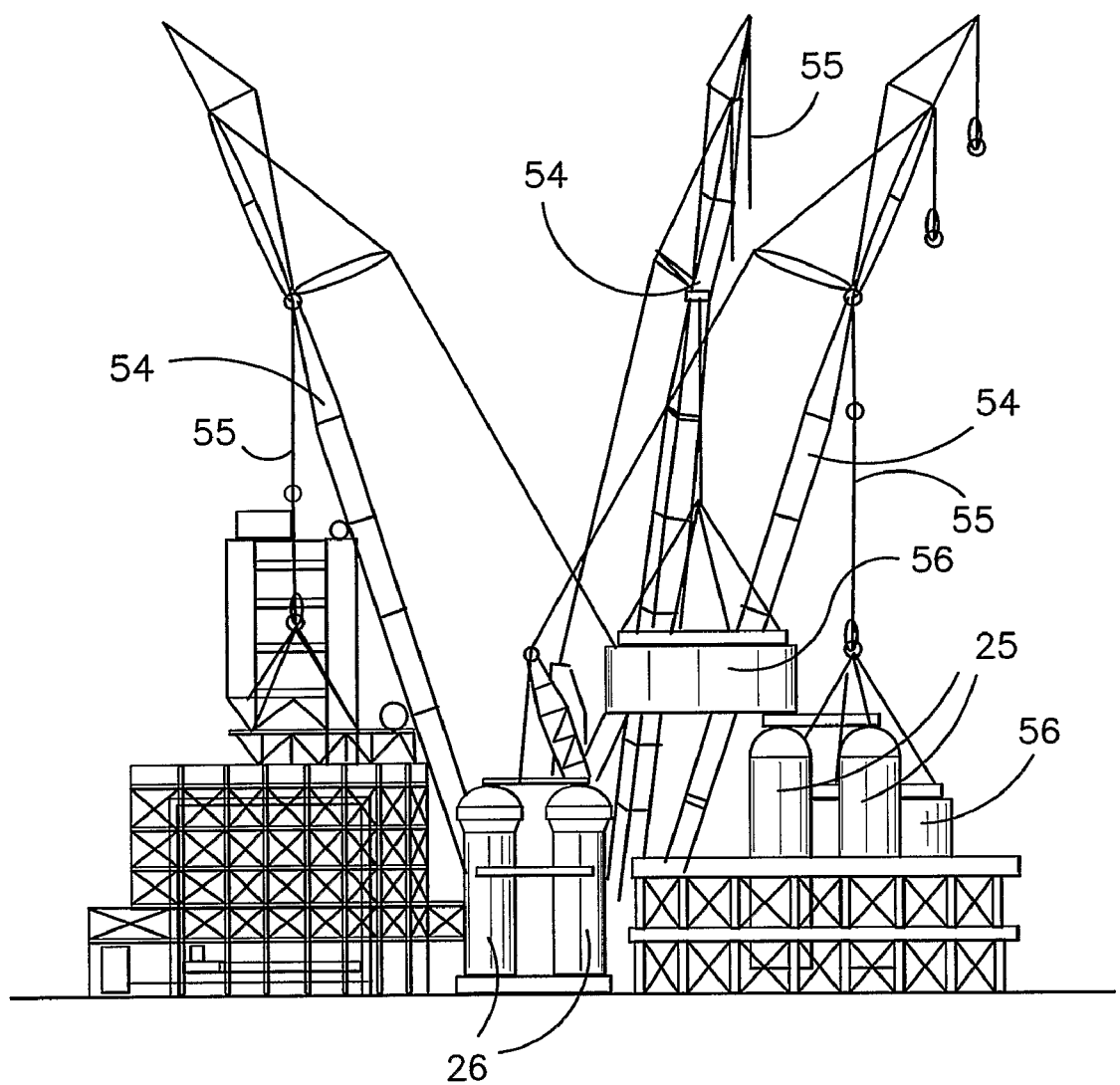

Vessel 11 is fitted with a downwardly extending gas injection lance 21 for delivering a hot air blast into the upper region of the vessel and eight solids injection lances 22 (two only shown in FIG. 2) extending downwardly and inwardly through the side walls for injecting iron ore, solid carbonaceous material and fluxes entrained in an oxygen deficient carrier gas into the bottom part of the vessel.

Gas injection lance 21 receives an oxygen enriched hot air flow through a hot gas delivery duct 23 that extends from a hot gas supply station denoted generally as 24 which is located on the plant site in the vicinity of the reduction vessel 11. The hot gas supply station 24 incorporates a series of hot gas stoves 25, 26 that receive oxygen from an oxygen plant 27 and air under pressure from a blower. This enables an oxygen enriched air stream to be passed through the hot gas stoves and into the elevated hot gas delivery duct 23 which extends to a connection with the gas injection lance 21 at a location above the reduction vessel 11.

The offgas outlet 17 is connected to an offgas duct 31 which transports the offgas away from the reduction vessel 11 to a treatment station 32 located on the plant site a short distance away from the reduction vessel 11 and generally to the opposite side of that vessel from the hot gas supply station 24. The offgas treatment station includes an offgas hood 33 of inverted U-shaped formation extending well above the height of the vessel 11, and typically extending above a height of 45 m, and incorporating pressure relief valves 34. The offgas passes upwardly and then downwardly through hood 33 to an offgas scrubber 36 and demister 37 installed as part of the offgas treatment station 32.

The solids injection lances 22 receive hot ore from ore pre-treatment station 43 and coal and flux from a coal and flux pre-treatment station 41. The coal and flux pre-treatment station 41 is installed on the plant site at a location spaced from the reduction vessel 11 and generally to the same side of that vessel as the offgas treatment station 32. The ore pre-treatment station 43 pre-treats the ore, such as by pre-heating it to a temperature exceeding 200° C., and delivers the pre-treated ore via the respective ore injection lances 22 into vessel 11. The ore pre-treatment station may consist of a series of fluid bed reactors and separation cyclones, some of which are typically installed with an elevation exceeding 45 meters and typically with a maximum elevation in the range 60-90 meters. Coal and flux pre-treatment station 41 also includes coal and flux delivery and fluidising hoppers 45, 46 to produce a flow of coal and flux to the remaining solids injection lances 22.

Hot metal is continuously tapped from vessel 11 through forehearth 18 and flows through appropriate launders to ladles which are transferred to hot metal desulphurisation station installed on the plant site at a location adjacent the metal delivery vessel and generally on the same side of that vessel as the hot air delivery station 24. After desulphursation at the desulphurisation station, the hot metal is delivered in the ladles to pig casters 48.

Slag intermittently tapped from vessel 11 flows through slag launders to slag pits located behind vessel 11 and generally between the solids injection station and the hot metal desulphurisation station.

In a commercial scale production plant as illustrated, the direct smelting vessel and the ancillary components are of extremely large size and weight in the finished construction. Indeed, several of the ancillary components such as the stoves and the offgas hood and scrubbers are very tall and are much larger than the reduction vessel itself. The normal method of building such a large scale plant would be to build the vessel and each of the ancillary components at the various stations from the ground up on site requiring large teams of people to work on the site at the same time with complicated delivery schedules and quality control problems. The present invention enables not only the direct smelting vessel but also major ancillary components of the plant to be fabricated offsite and lifted into position by a heavy lift crane in a relatively rapid installation process.

The installation process involves the use of a heavy lift capacity crane, typically a ringer crane 51 comprising a crane carriage 52 supported on a circular ring track 53. The ring track 53 and carriage 52 are installed on a suitable load bearing base constructed on the plant site. A crane boom 54 is attached to the crane carriage and can be hoisted by operation of a winch 55 to lift a heavy load 56 (such as a bottom section of the metal reduction vessel 11), the weight of that load being counteracted by counterweights or ballast 57 mounted on the carriage so as to also be supported on the ring track 52.

The ring track 53 of ringer crane 51 is firstly installed on the plant site immediately in front of the location at which the metal reduction vessel 11 is to be installed. The boom 56 is then brought onto site and laid out along an elongate stretch of the site which is to become a corridor 60 between major ancillary components at the various stations of the plant when the plant is fully erected. The boom is then connected to the carriage and hoisted so as to provide a high lift capacity over a ground area which the ringer crane can sweep about the carriage and ringer track. Typically an angle of approximately 180 degrees is provided between an axis of the corridor and a line extending between the center of the carriage and the center of the smelt reduction vessel.

The ground area swept by the crane is such as to embrace the proposed sites of the smelting vessel 11 and major ancillary components, such as those in the hot air supply station 24, the offgas treatment station 32, the coal and flux pre-treatment station 41, the ore pre-treatment station 43, the hot metal desulphurisation station and also the hot metal and slag launders extending from the smelting reduction vessel. Prefabricated components are brought onto site and lifted by the ringer crane, typically from the corridor into the appropriate positions for final installation and connection with the remainder of the plant. Because of the high lift capacity of the ringer crane, it is possible to build permanent housings, building structures and bridges which are to house or extend between the various major components of the plant prior to the installation of those components and then merely lift the relevant components and deposit them downwardly through these surrounding structures into final position. For example, the reduction vessel may in the final installation be surrounded by a frame work structure carrying walkways and cooling water manifolds for flow of cooling water to and from cooling panels located within the vessel. This structure can be erected initially with an open top and the reduction vessel installed by hoisting it downwardly into the surrounding structure.

Depending on the lifting capacity of the crane, it will generally be necessary to install the reduction vessel and some other components in a number of pieces or sections. For example, the ringer crane may be of a type having a lift capacity rating of the order of six hundred tonnes. Typically, such a crane would be capable of lifting loads exceeding 100 metric tonnes at a radius from the carriage of 50% or less of the length of the corridor and typically in the range 10%-45% of the length of the corridor. Additionally, loads in the order of two hundred metric tonnes at a radius of approximately 50 meters from the ring track may be lifted by certain heavy lift cranes. As a result, the reduction vessel may need to be fabricated in three sections to be hoisted successively into place in order to remain within this lift capacity. Similarly, the stoves 25, 26 may need to be made in two or more sections to remain within the maximum lift capacity of the crane. Nevertheless, all of the ancillary components can be largely fabricated offsite with consequent better quality control and inspection and with very significant savings in onsite manpower during the plant installation.

The vessel and ancillary components are installed to leave the elongate corridor 60 of vacant ground extending through the swept area of the crane to the ring track. Elevated pipe support structures may extend along or adjacent one or both boundaries of the corridor over a major part of the corridor's length. These support structures may be installed ahead of the ringer crane so that the ringer crane is assembled in between the support structures. Alternately the pipe support structures may be installed simultaneously with the ringer crane in position. It is therefore preferable that the foundations for the pipe support structures and the smelting vessel along with some or all of the ancillary components be installed prior to assembly on site of the heavy lift crane. These embodiments allow construction of the pipe support structures and/or the pipes and/or other equipment located within the support structures simultaneously with location and operation of the ringer crane on site.

The off-gas hood 33 and the ore pre-treatment station 43 extend to elevated heights exceeding 45 meters above the ground and in particular, the ore pre-treatment station may have a maximum elevation in the range 60-90 meters. To install components and equipment at these heights, the stations are located a pre-determined radius from the carriage 52 that is sufficient to provide the lifting boom with the necessary vertical reach. Typically this radius is 50% or less of the length of the corridor and may be in the range 10%-45% of the length of the corridor. In addition, the radius may be further restricted by the lateral extent of buildings and other support structures for the smelt reduction vessel, the off-gas hood and the ore pre-treatment tower.

Ancillary equipment located within the swept ground area of the boom and having an elevation exceeding 40 meters off the ground may restrict the ability of the boom to swivel about the entirety of the ringer when lifting a load. Accordingly it is preferable to locate the off-gas hood and the ore pre-treatment tower in close proximity to each other as both typically have a height exceeding 45 meters. Preferably they are located adjacent the smelt reduction vessel at a first end of the corridor away from the corridor's elongate boundaries. Such location minimises the extent of the ringer, if any, that the crane can not swivel through whilst lifting a load and in particular enables the lifting boom to swing through an arc exceeding 100 degrees between the lifting area and the installation point.

It is also preferable that the maximum elevation of ancillary equipment/components located within the ground swept area of the lifting boom and adjacent one or both elongate boundaries of the corridor is restricted so that the lifting boom can lift loads over such ancillary equipment/components. This allows the majority of components that are to be lifted to be delivered into the corridor at a distance from the carriage that corresponds to the radius of the ground area swept by the boom of the heavy lift crane.

Figure 8:
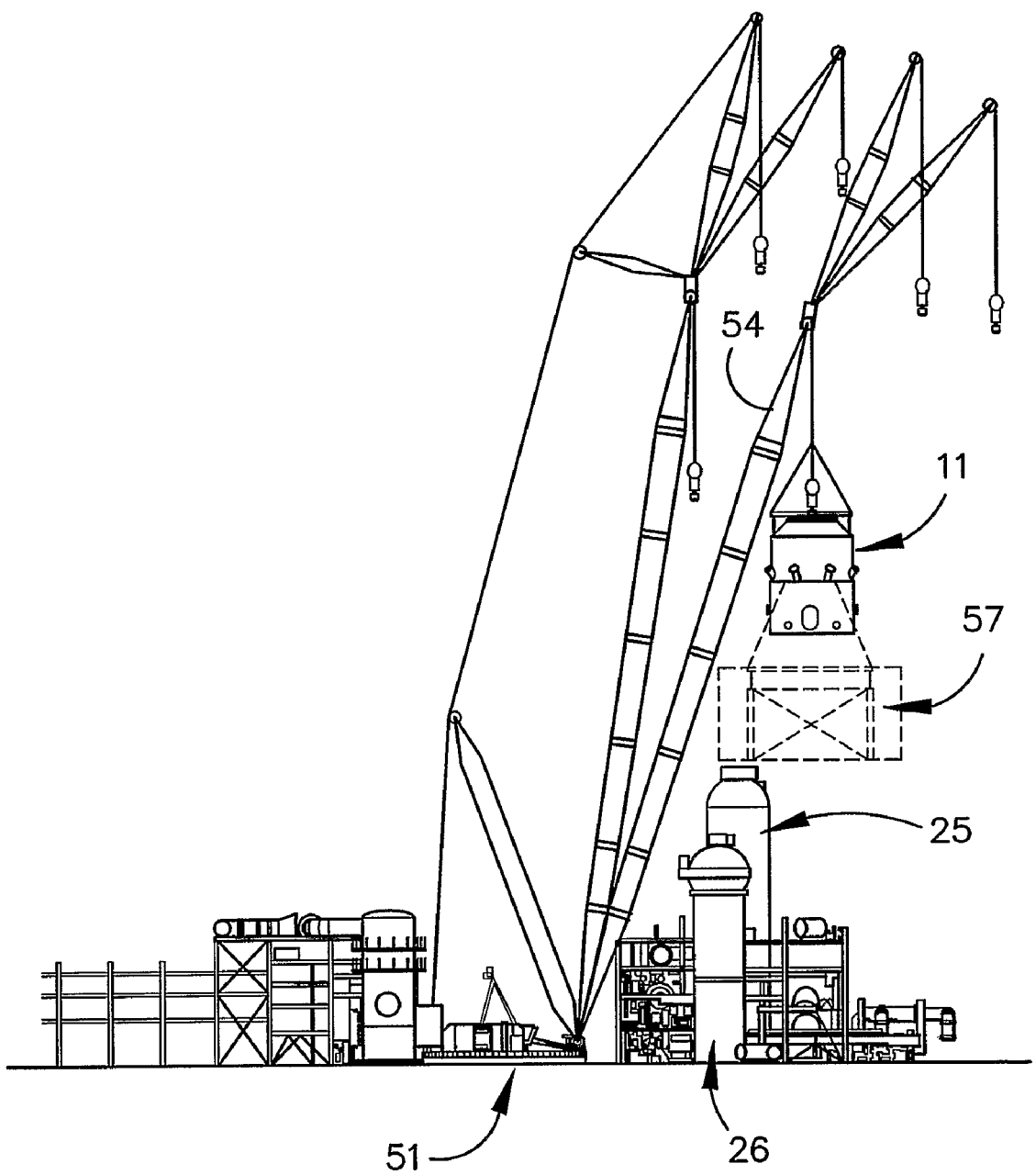
FIG. 8 shows the crane in operation to hoist a plant components over a stove.

Typically such a maximum elevation is restricted to be no more than 40 meters from the ground. Such a restriction allows the lifting boom to lift loads from the corridor and to swivel them through an arc of at least 100 degrees from one or both elongate boundaries of the corridor. The lifting boom preferably swivels through an arc of 180 degrees or more from at least one boundary of said corridor when installing the smelt reduction vessel, the off-gas hood and the ore pre-treatment unit in close proximity and adjacent one end of the corridor and away from the elongate boundaries of the corridor. For example, and as depicted in FIG. 8, certain components (or modules such as module 57 of a vessel access tower to surround the vessel 11) installed by the crane may have a significant lateral extent that, having regard to the weight of the module, prevents the boom from lifting the module significantly above a height of between 35 and 40 meters. This places a limitation on the elevation of equipment and components installed within the swept area between the point from where the load is initially lifted to the point where the load is installed. Equipment elevated above this height would restrict the arc through which the boom can swivel and so would prevent the boom from swiveling to the point for installation of the module.

When the crane is not being used during extended installation or during periods of high wind, the crane boom 54 may be lowered down to lie on the ground along the corridor. When installation of the vessel and the various ancillary components has been completed, the boom is laid down along the corridor 60 and the crane is dismantled and removed from site by passing along the corridor. After the crane is removed, the corridor is left as a lane way providing access to the vessel and to the various ancillary components, for example, by mobile cranes once the plant is operational.

Accordingly, and as illustrated above, construction of a direct smelting plant by use of a heavy lift crane, places restrictions on the locations of plant and equipment such as the smelt reduction vessel, the off-gas hood, the ore pre-treatment tower and the stoves. These restrictions need to allow for the crane to be disassembled and removed from site once the installations are completed. These restrictions also place limitations on location and height of equipment within the ground area swept by the boom of the crane to allow for the crane and ringer to be assembled once only on site installation of at least the smelting reduction vessel, the off-gas hood and the stoves.

The illustrated direct smelting plant has been advanced by way of example only. It is to be understood that the particular layout of that plant could be varied and the kinds of ancillary equipment could also vary considerably according to the materials and fuels available for smelting. Such variations can be made within the scope of the appended claims.

The invention claimed is:

1. A method of building a direct smelting plant comprising:
   locating a ring track of a ringer crane on a plant site such that a lifting boom of the ringer crane can sweep a ground area about the ring track;
   installing a metal smelting vessel and ancillary plant components within said swept ground area by lifting with the crane the vessel and the ancillary plant components either as prefabricated whole units or in prefabricated pieces into locations within the swept ground area, but so as to leave an elongate corridor of vacant ground extending through the swept area to the ring track, at least some of the ancillary plant components being positioned at locations spaced along the corridor;
   lowering the boom down into the corridor; and
   dismantling and removing the ringer crane and leaving at least part of the corridor available for vehicular access to the metal smelting vessel.

2. A method as claimed in claim 1, wherein a major part of the corridor is left available for vehicular access to the smelting vessel and at least some of said auxiliary components.

3. A method as claimed in claim 1, wherein the ring track of the ringer crane is a circular track and is spanned by a crane carriage extending diametrically across the track and rotatable about a central vertical axis.

4. A method as claimed in claim 3, wherein the boom of the crane is in use attached to the carriage at one side of the carriage generally above the track and the crane counterweight or counterweights are supported on the carriage generally over the track at or toward an opposite side of the carriage.

5. A method as claimed in claim 1, wherein the major plant components comprise any one or more of vessel input gas heaters and ducting, vessel input solids feed apparatus, offgas ducting and treatment apparatus, and molten metal and slag tapping and handling apparatus.

6. A method as claimed in claim 1, wherein the ancillary plant components positioned at locations spaced along the corridor are positioned generally in rows spaced to either side of the corridor.

7. A method as claimed in claim 1, wherein the smelting vessel is positioned at an end of the corridor.

8. A method as claimed in claim 7, wherein the smelting vessel is initially located adjacent the crane ring track in alignment with the corridor and at least some of the ancillary plant components are located generally in rows extending from the smelting vessel along and to either side of the corridor.

9. A method as claimed in claim 1, wherein the crane is assembled initially by laying the boom out along the ground which is to form the corridor and then erecting the boom to extend upwardly from the ring track.

10. A method as claimed in claim 9, wherein following assembly of the crane the vessel and major plant components are transported to the corridor area and lifted from that area by the crane into said locations.

11. A method of building a direct smelting plant consisting of a smelt reduction vessel and ancillary plant using a heavy lift crane, comprising;
   forming a load bearing base for the heavy lift crane on the site of the direct smelting plant;
   locating the heavy lift crane on the load bearing base and assembling a lifting boom to a carriage of the crane so as to enable the boom to sweep a ground area about the carriage to thereby provide a swept ground area;
   installing the smelt reduction vessel and ancillary plant components within said swept ground area by lifting with the crane the vessel and the ancillary plant components either as prefabricated whole units or in prefabricated pieces into locations within the swept ground area while leaving an elongate corridor of vacant ground extending through the swept area to the carriage;
   selecting ancillary equipment and/or components for installation within at least a portion of said swept ground area such that the ancillary equipment and/or components have a maximum elevation that is restricted, whereby the lifting boom of the heavy lift crane can lift said prefabricated whole units or said prefabricated pieces over said ancillary equipment located within said portion of said swept ground area;
   installing the ancillary equipment and/or components within said portion of said swept ground area;
   selecting one or more locations for the ancillary equipment and/or components within said swept ground area so as to enable said boom of said heavy lift crane to sweep at least a 100 degree arc when lifting the ancillary equipment and/or components;
   lowering the boom down into the corridor; and dismantling and removing the crane and leaving at least part of the corridor available for vehicular access to the smelt reduction vessel.

12. A method as claimed in claim 11, wherein installation of additional plant and equipment subsequent to removal of said crane from said site is such as to provide that a major part of the corridor is left available for vehicular access to the smelting vessel and at least some of said auxiliary components once said plant is operational.

13. A method as claimed in claim 11, wherein said portion of said swept ground area comprises one or both elongate boundaries of said corridor.

14. A method as claimed in claim 11, wherein said maximum elevation is 40 meters.

15. A method as claimed in claim 11, further comprising selecting locations for installing with said heavy lift crane at selected locations on said site one or more prefabricated whole units or prefabricated pieces having a weight exceeding 90 metric tons, said locations selected so as to be within a swept area having a radius from said carriage that is at most 50% of the length of said corridor.

16. A method as claimed in claim 15, wherein said one or more prefabricated whole units or prefabricated pieces having a weight exceeding 90 metric tonnes includes one or more of: smelt reduction vessel, vessel input gas heaters and off-gas ducting.

17. A method as claimed in claim 15, wherein said radius within the range of 10% to 45% of the length of the corridor.

18. A method as claimed in claim 11, further comprising installing with said heavy lift crane at selected locations on said site one or more prefabricated whole units or prefabricated pieces at a maximum elevation above the load bearing base that exceeds 45 meters, said locations selected so as to be within a swept area having a radius from said carriage that is at most 50% of the length of said corridor to thereby provide said lifting boom with sufficient vertical reach for said installation.

19. A method as claimed in claim 18, wherein said prefabricated whole units or prefabricated pieces installed having the maximum elevation above the lead bearing base exceeding 45 meters are installed within said swept area so as to be sufficiently remote from at least one elongate edge of said corridor as to enable said crane boom to sweep an arc of at least 100 degrees when lifting a prefabricated whole unit or piece.

20. A method as claimed in claim 18, wherein said one or more prefabricated whole units or prefabricated pieces installed at a height exceeding 45 meters includes one or more of: off-gas ducting and ore pre-treatment apparatus.

21. A method as claimed in claim 18, wherein said radius is within the range of 10% to 45% of the length of said corridor.

22. A method as claimed in claim 11, wherein foundations for at least one of the smelt reduction vessel and the ancillary plant are put in place prior to placing the heavy lift crane onto the load bearing base.

23. A method as claimed in claim 22, wherein piping support structures are put in place prior to placing the heavy lift crane onto the load bearing base.

24. A method as claimed in claim 23, wherein said heavy lift crane installs the ancillary equipment adjacent to or within the piping support structures and the method further comprising connecting said ancillary equipment to piping installed on said piping support structure.

25. A method as claimed in claim 24, wherein part of said piping support structures form at least one elongated boundary of the corridor.

26. A method as claimed in claim 11, wherein the heavy lift crane is a ringer crane having a ring track located on the load bearing base.

27. A method as claimed in claim 11, wherein the crane is assembled initially by laying the boom out along the ground which is to form the corridor and then erecting the boom to extend upwardly from a ring track.

28. A method as claimed in claim 27, wherein following assembly of the crane the vessel and major plant components are transported to the corridor area and lifted from that area by the crane into said locations.

29. A method as claimed in claim 11, wherein the crane carriage is removed by moving along the corridor.

* * * * *